(12) United States Patent
Otake et al.

(10) Patent No.: US 9,285,017 B2
(45) Date of Patent: Mar. 15, 2016

(54) AUTOMATIC TRANSMISSION DEVICE

(71) Applicants: AISIN AW CO., LTD., Anjo-shi, Aichi-ken (JP); TOYOTA JIDOSHA KABUSHIKI KAISHA, Toyota-shi, Aichi-ken (JP)

(72) Inventors: Masahiro Otake, Nishio (JP); Toru Souda, Okazaki (JP); Satoru Kasuya, Nishio (JP); Nobukazu Ike, Kariya (JP); Hiroshi Kato, Kariya (JP); Shinji Oita, Toyota (JP); Masaru Morise, Nakata-gun (JP)

(73) Assignees: AISIN AW CO., LTD., Anjo (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/379,130

(22) PCT Filed: Feb. 27, 2013

(86) PCT No.: PCT/JP2013/055053
§ 371 (c)(1),
(2) Date: Aug. 15, 2014

(87) PCT Pub. No.: WO2013/146027
PCT Pub. Date: Oct. 3, 2013

(65) Prior Publication Data
US 2015/0018159 A1    Jan. 15, 2015

(30) Foreign Application Priority Data

Mar. 28, 2012    (JP) .................................. 2012-074070

(51) Int. Cl.
*F16H 3/62*    (2006.01)
*F16H 3/66*    (2006.01)
*F16H 3/44*    (2006.01)

(52) U.S. Cl.
CPC .. *F16H 3/62* (2013.01); *F16H 3/66* (2013.01); *F16H 2003/442* (2013.01); *F16H 2003/445* (2013.01); *F16H 2200/006* (2013.01); *F16H 2200/0065* (2013.01); *F16H 2200/2012* (2013.01); *F16H 2200/2046* (2013.01); *F16H 2200/2064* (2013.01)

(58) Field of Classification Search
CPC ........................................................ F16H 3/62
USPC ........................................................ 475/903
See application file for complete search history.

(56) References Cited

U.S. PATENT DOCUMENTS 4,229,996 A * 10/1980 Hildebrand ...................... 475/55
2007/0225097 A1 * 9/2007 Raghavan et al. ................ 475/5
2011/0009229 A1    1/2011 Bauknecht et al.

FOREIGN PATENT DOCUMENTS

JP    A-51-151454    12/1976
JP    A-52-074766    6/1977
(Continued)

*Primary Examiner* — Derek D Knight
*Assistant Examiner* — David Morris
(74) *Attorney, Agent, or Firm* — Oliff PLC

(57) ABSTRACT

An automatic transmission for adjusting the relative speed between an input and output member. The transmission being configured with four planetary gears, the first having first to third rotary elements, the second having fourth to sixth rotary elements, the third having seventh to ninth rotary elements, the fourth having tenth to twelfth rotary elements. Three couplings between (i) first and sixth rotary elements, (ii) second and fifth rotary elements, and (iii) eighth and twelfth rotary elements. Three clutches are provided between (i) the second coupling and input member, (ii) third coupling and input member, and (iii) seventh rotary element and input member. Three brakes are provided at (i) the fourth rotary element, (ii) third coupling element, and (iii) tenth rotary element. The output member is connected to the third rotary element.

20 Claims, 5 Drawing Sheets

(56) References Cited

FOREIGN PATENT DOCUMENTS

| JP | A-2010-002028 | 1/2010 |
| JP | A-2011-513662 | 4/2011 |
| JP | A-2012-097777 | 5/2012 |
| JP | A-2012-122569 | 6/2012 |
| WO | WO 2011020889 A1 * | 2/2011 ............ F16H 3/44 |

* cited by examiner

FIG. 2

| | C1 | C2 | C3 | B1 | B2 | B3 | GEAR RATIO | STEP RATIO |
|---|---|---|---|---|---|---|---|---|
| 1 | | | ○ | ○ | | ○ | 4.906 | |
| 2 | | ○ | | ○ | | ○ | 2.616 | 1.875 |
| 3 | | ○ | ○ | ○ | | | 1.585 | 1.650 |
| 4 | ○ | ○ | | ○ | | | 1.220 | 1.299 |
| 5 | ○ | ○ | ○ | | | | 1.000 | 1.220 |
| 6 | ○ | ○ | | | | ○ | 0.809 | 1.236 |
| 7 | ○ | | ○ | | | ○ | 0.711 | 1.138 |
| 8 | ○ | | | | ○ | ○ | 0.625 | 1.138 |
| 9 | ○ | | ○ | | | ○ | 0.535 | 1.168 |
| R | | | ○ | ○ | ○ | | -3.523 | |

GEAR RATIO WIDTH 9.170

| | C901 | C902 | DC | DB | B901 | B902 | GEAR RATIO | STEP RATIO |
|---|---|---|---|---|---|---|---|---|
| 1 | | | O | O | | O | 4.610 | |
| 2 | | | O | O | O | | 2.870 | 1.606 |
| 3 | O | | O | O | | | 1.840 | 1.560 |
| 4 | | O | (O) | O | | | 1.360 | 1.353 |
| 5 | O | O | O | | | | 1.000 | 1.360 |
| 6 | | O | O | | O | | 0.790 | 1.266 |
| 7 | | O | O | | | O | 0.690 | 1.145 |
| 8 | | O | | | O | O | 0.580 | 1.190 |
| 9 | O | O | | | | O | 0.460 | 1.261 |
| R | O | | | O | | O | -3.150 | |

GEAR RATIO WIDTH 10.02

AUTOMATIC TRANSMISSION DEVICE

TECHNICAL FIELD

The present invention relates to an automatic transmission device that changes the speed of power input to an input member to output the power to an output member.

BACKGROUND ART

Hitherto, there has been proposed an automatic transmission device capable of establishing nine forward speeds and a reverse speed with four planetary gear mechanisms, three clutches, and three brakes (see Patent Document 1, for example). The configuration of the device is illustrated in FIG. 5. As illustrated in the drawing, an automatic transmission device 901 according to a conventional example as the background art includes single-pinion first to fourth planetary gear mechanisms 910, 920, 930, and 940 each composed of a sun gear 911, 921, 931, or 941 which is an externally toothed gear, a ring gear 913, 923, 933, or 943 which is an internally toothed gear, and a carrier 912, 922, 932, and 942 that rotatably and revolvably holds a plurality of pinion gears 914, 924, 934, and 944 by coupling the pinion gears 914, 924, 934, and 944 to each other, respectively. The sun gear 911 and the sun gear 921 are coupled to each other by a first coupling element 951. The ring gear 913 and the carrier 922 are coupled to each other by a second coupling element 952. The ring gear 923, the carrier 932, and the carrier 942 are coupled to each other by a third coupling element 953. The fourth planetary gear mechanism 940 is formed on the outer peripheral side of the third planetary gear mechanism 930. The ring gear 933 and the sun gear 941 are coupled to each other by a fourth coupling element 954. The sun gear 931 is connected to an input shaft 903 via a clutch C901, and connected to a case 902 via a brake B901. The second coupling element 952 is connected to the input shaft 903 via a clutch C902. Further, the fourth coupling element 954 is connected to the input shaft 903 via a dog clutch DC. The first coupling element 951 is connected to the case 902 via a dog brake DB. The ring gear 943 of the fourth planetary gear mechanism 940 is connected to the case 902 via a brake B902. An output gear 904 is connected to the carrier 912 of the first planetary gear mechanism 910.

In the automatic transmission device 901 according to the conventional example, the gear ratios λ1, λ2, λ3, and λ4 of the first to fourth planetary gear mechanisms 910, 920, 930, and 940 (the number of teeth of the sun gear/the number of teeth of the ring gear in each of the planetary gear mechanisms) are set to 0.36, 0.36, 0.56, and 0.66, respectively. As illustrated in the operation table of FIG. 6, a first forward speed to a ninth forward speed and a reverse speed are established, and the gear ratio width which is calculated as the gear ratio of the first forward speed (lowest speed)/the gear ratio of the ninth forward speed (highest speed) is 10.02.

In the automatic transmission device 901 according to the conventional example, in addition, with the ninth forward speed which is the highest speed established, the clutch C901, the clutch C902, and the brake B902 are engaged, and the dog clutch DC, the dog brake DB, and the brake B901 are disengaged. Thus, all (four) of the first to fourth planetary gear mechanisms 910, 920, 930, and 940 operate as a gear mechanism for torque transfer from the input shaft 903 to the output gear 904. With the eighth forward speed which is one step lower than the highest speed established, meanwhile, the clutch C902, the brake B901, and the brake B902 are engaged, and the clutch C901, the dog clutch DC, and the dog brake DB are disengaged. Thus, two of the planetary gear mechanisms, namely the first planetary gear mechanism 910 and the second planetary gear mechanism 920, operate as a gear mechanism for torque transfer from the input shaft 903 to the output gear 904.

RELATED-ART DOCUMENTS

Patent Documents

[Patent Document 1] Published Japanese Translation of PCT Application No. 2011-513662 (JP 2011-513662 A)

SUMMARY OF THE INVENTION

In such an automatic transmission device, in the case where an automatic transmission is composed of four planetary gear mechanisms and a plurality of clutches and brakes, there are a large number of manners to connect the rotary elements of the four planetary gear mechanisms and to attach the plurality of clutches and brakes, and the device can function as or cannot function as an automatic transmission device depending on the manner of connection or attachment. In addition, if the number of planetary gear mechanisms that operate for torque transfer from the input side to the output side at the highest forward speed or a shift speed that is one step lower than the highest forward speed is smaller, a loss due to meshing between gears is reduced, which enhances the torque transfer efficiency.

It is a main object of the present invention to propose a new automatic transmission device with four planetary gear mechanisms, three clutches, and three brakes. It is a further object of the present invention to improve the torque transfer efficiency.

In order to achieve at least the foregoing main object, the automatic transmission device according to the present invention adopts the following means.

The present invention provides an automatic transmission device that changes a speed of power input to an input member to output the power to an output member, characterized by including:

a first planetary gear mechanism including first to third rotary elements that form a sequence of the first rotary element, the second rotary element, and the third rotary element when arranged in an order at intervals corresponding to gear ratios in a velocity diagram;

a second planetary gear mechanism including fourth to sixth rotary elements that form a sequence of the fourth rotary element, the fifth rotary element, and the sixth rotary element when arranged in an order at intervals corresponding to gear ratios in a velocity diagram;

a third planetary gear mechanism including seventh to ninth rotary elements that form a sequence of the seventh rotary element, the eighth rotary element, and the ninth rotary element when arranged in an order at intervals corresponding to gear ratios in a velocity diagram;

a fourth planetary gear mechanism including tenth to twelfth rotary elements that form a sequence of the tenth rotary element, the eleventh rotary element, and the twelfth rotary element when arranged in an order at intervals corresponding to gear ratios in a velocity diagram;

a first coupling element that couples the first rotary element, the sixth rotary element, the ninth rotary element, and the eleventh rotary element to each other;

a second coupling element that couples the second rotary element and the fifth rotary element to each other;

a third coupling element that couples the eighth rotary element and the twelfth rotary element to each other;

a first clutch that engages and disengages the second coupling element and the input member with and from each other;

a second clutch that engages and disengages the third coupling element and the input member with and from each other;

a third clutch that engages and disengages the seventh rotary element and the input member with and from each other;

a first brake that is disengageably engaged so as to hold the fourth rotary element stationary with respect to an automatic transmission device case;

a second brake that is disengageably engaged so as to hold the third coupling element stationary with respect to the automatic transmission device case; and a third brake that is disengageably engaged so as to hold the tenth rotary element stationary with respect to the automatic transmission device case, wherein the output member is connected to the third rotary element.

The automatic transmission device according to the present invention includes: the first planetary gear mechanism including as three rotary elements the first to third rotary elements which form a sequence of the first rotary element, the second rotary element, and the third rotary element when arranged in an order at intervals corresponding to gear ratios in a velocity diagram; the second planetary gear mechanism including as three rotary elements the fourth to sixth rotary elements which form a sequence of the fourth rotary element, the fifth rotary element, and the sixth rotary element when arranged in an order at intervals corresponding to gear ratios in a velocity diagram; the third planetary gear mechanism including as three rotary elements the seventh to ninth rotary elements which form a sequence of the seventh rotary element, the eighth rotary element, and the ninth rotary element when arranged in an order at intervals corresponding to gear ratios in a velocity diagram; and the fourth planetary gear mechanism including as three rotary elements the tenth to twelfth rotary elements which form a sequence of the tenth rotary element, the eleventh rotary element, and the twelfth rotary element when arranged in an order at intervals corresponding to gear ratios in a velocity diagram, and the first rotary element, the sixth rotary element, the ninth rotary element, and the eleventh rotary element are coupled to each other by the first coupling element, the second rotary element and the fifth rotary element are coupled to each other by the second coupling element, and the eighth rotary element and the twelfth rotary element are coupled to each other by the third coupling element. Then, the second coupling element and the input member are connected to each other via the first clutch, the third coupling element and the input member are engaged with each other via the second clutch, the seventh rotary element and the input member are connected to each other via the third clutch, the first brake is connected to the fourth rotary element, the second brake is connected to the third coupling element, the third brake is connected to the tenth rotary element, and the output member is connected to the third rotary element. This makes it possible to constitute an automatic transmission device that can function with the four planetary gear mechanisms, the three clutches, and the three brakes.

In the thus configured automatic transmission device according to the present invention, a first forward speed to a ninth forward speed and a reverse speed may be established as follows:

(1) The first forward speed is established by engaging the third clutch, the first brake, and the third brake and disengaging the first clutch, the second clutch, and the second brake.

(2) The second forward speed is established by engaging the second clutch, the first brake, and the third brake and disengaging the first clutch, the third clutch, and the second brake.

(3) The third forward speed is established by engaging the second clutch, the third clutch, and the first brake and disengaging the first clutch, the second brake, and the third brake.

(4) The fourth forward speed is established by engaging the first clutch, the second clutch, and the first brake and disengaging the third clutch, the second brake, and the third brake.

(5) The fifth forward speed is established by engaging the first clutch, the second clutch, and the third clutch and disengaging the first brake, the second brake, and the third brake.

(6) The sixth forward speed is established by engaging the first clutch, the second clutch, and the third brake and disengaging the third clutch, the first brake, and the second brake.

(7) The seventh forward speed is established by engaging the first clutch, the third clutch, and the third brake and disengaging the second clutch, the first brake, and the second brake.

(8) The eighth forward speed is established by engaging the first clutch, the second brake, and the third brake and disengaging the second clutch, the third clutch, and the first brake.

(9) The ninth forward speed is established by engaging the first clutch, the third clutch, and the second brake and disengaging the second clutch, the first brake, and the third brake.

(10) The reverse speed is established by engaging the third clutch, the first brake, and the second brake and disengaging the first clutch, the second clutch, and the third brake.

Consequently, there can be provided a device capable of selectively establishing a first forward speed to a ninth forward speed and a reverse speed with the four planetary gear mechanisms, the three clutches, and the three brakes.

As discussed above, with the ninth forward speed which is the highest speed established, the first clutch, the third clutch, and the second brake are engaged, and the second clutch, the first brake, and the third brake are disengaged. In the second planetary gear mechanism, the fourth rotary element is disengaged through disengagement of the first brake. Thus, the second planetary gear mechanism is not involved in torque transfer between the input member and the output member. In the fourth planetary gear mechanism, the tenth rotary element is disengaged through disengagement of the third brake. Thus, the fourth planetary gear mechanism is not involved in torque transfer between the input member and the output member. Thus, with the ninth forward speed established, two of the planetary gear mechanisms, namely the first planetary gear mechanism and the third planetary gear mechanism, operate as a gear mechanism for torque transfer between the input member and the output member. With the eighth forward speed which is one step lower than the highest speed established, meanwhile, the first clutch, the second brake, and the third brake are engaged, and the second clutch, the third clutch, and the first brake are disengaged. In the second planetary gear mechanism, the fourth rotary element is disengaged through disengagement of the first brake. Thus, the second planetary gear mechanism is not involved in torque transfer between the input member and the output member. In the third planetary gear mechanism, the seventh rotary element is disengaged through disengagement of the third clutch. Thus, the third planetary gear mechanism is not involved in torque transfer between the input member and the output member. In the fourth planetary gear mechanism, the twelfth rotary element and the tenth rotary element are held unrotatably stationary through engagement of the second brake and the third brake. Thus, the eleventh rotary element is also made unrotatable, and the fourth planetary gear mechanism does not operate as a gear mechanism for torque transfer between the input member and the output member. Thus, with the eighth forward speed established, only one of the planetary gear mechanisms, namely the first planetary gear mechanism, operates as a gear mechanism for torque transfer between the input member and the output member. As seen from the foregoing description, the number of planetary gear mechanisms that operate as a gear mechanism for torque transfer between the input member and the output member is two with the ninth forward speed which is the highest speed established, and one with the eighth forward speed which is one step lower than the highest speed established, and thus the number of planetary gear mechanisms that operate as a gear mechanism for torque transfer can be reduced compared to the automatic transmission device according to the conventional example, in which the number of planetary gear mechanisms that operate as a gear mechanism for torque transfer is four with the ninth forward speed which is the highest speed established, and two with the eighth forward speed which is one step lower than the highest speed established. This makes it possible to reduce a loss due to meshing between gears, and to enhance the torque transfer efficiency. That is, the torque transfer efficiency can be improved compared to the automatic transmission device according to the conventional example.

In the automatic transmission device according to the present invention discussed above, the first planetary gear mechanism, the second planetary gear mechanism, the third planetary gear mechanism, and the fourth planetary gear mechanism may each be constituted as a single-pinion planetary gear mechanism in which a sun gear, a ring gear, and a carrier are used as the three rotary elements; the first rotary element, the fourth rotary element, the seventh rotary element, and the tenth rotary element may each be a sun gear; the second rotary element, the fifth rotary element, the eighth rotary element, and the eleventh rotary element may each be a carrier; and the third rotary element, the sixth rotary element, the ninth rotary element, and the twelfth rotary element may each be a ring gear.

In the automatic transmission device according to the present invention, further, the first planetary gear mechanism may be provided on an outer peripheral side of the third planetary gear mechanism. Consequently, although the automatic transmission device is made larger in the radial direction, the automatic transmission device can be made shorter in the axial direction. That is, the automatic transmission device can have the same length in the axial direction as that of an automatic transmission device with three planetary gear mechanisms.

In the automatic transmission device according to the present invention, the planetary gear mechanisms may be disposed in an order of the second planetary gear mechanism, the first planetary gear mechanism and the third planetary gear mechanism, and the fourth planetary gear mechanism.

In the automatic transmission device according to the present invention, the first brake may be constituted as a dog brake. The dog brake tends to cause a shock during engagement, and requires synchronization control for synchronizing rotations. Because the first brake is kept engaged from the first forward speed to the fourth forward speed and kept disengaged from the fifth forward speed to the ninth forward speed, the first brake is not frequently repeatedly engaged and disengaged, and the synchronization control is less frequently performed. Therefore, degradation in shifting feeling is suppressed even if the dog brake is adopted.

BRIEF DESCRIPTION OF THE DRAWINGS

FIG. 2 is an operation table of the automatic transmission device 1.

MODES FOR CARRYING OUT THE INVENTION

An embodiment of the present invention will be described below.

Figure 1:
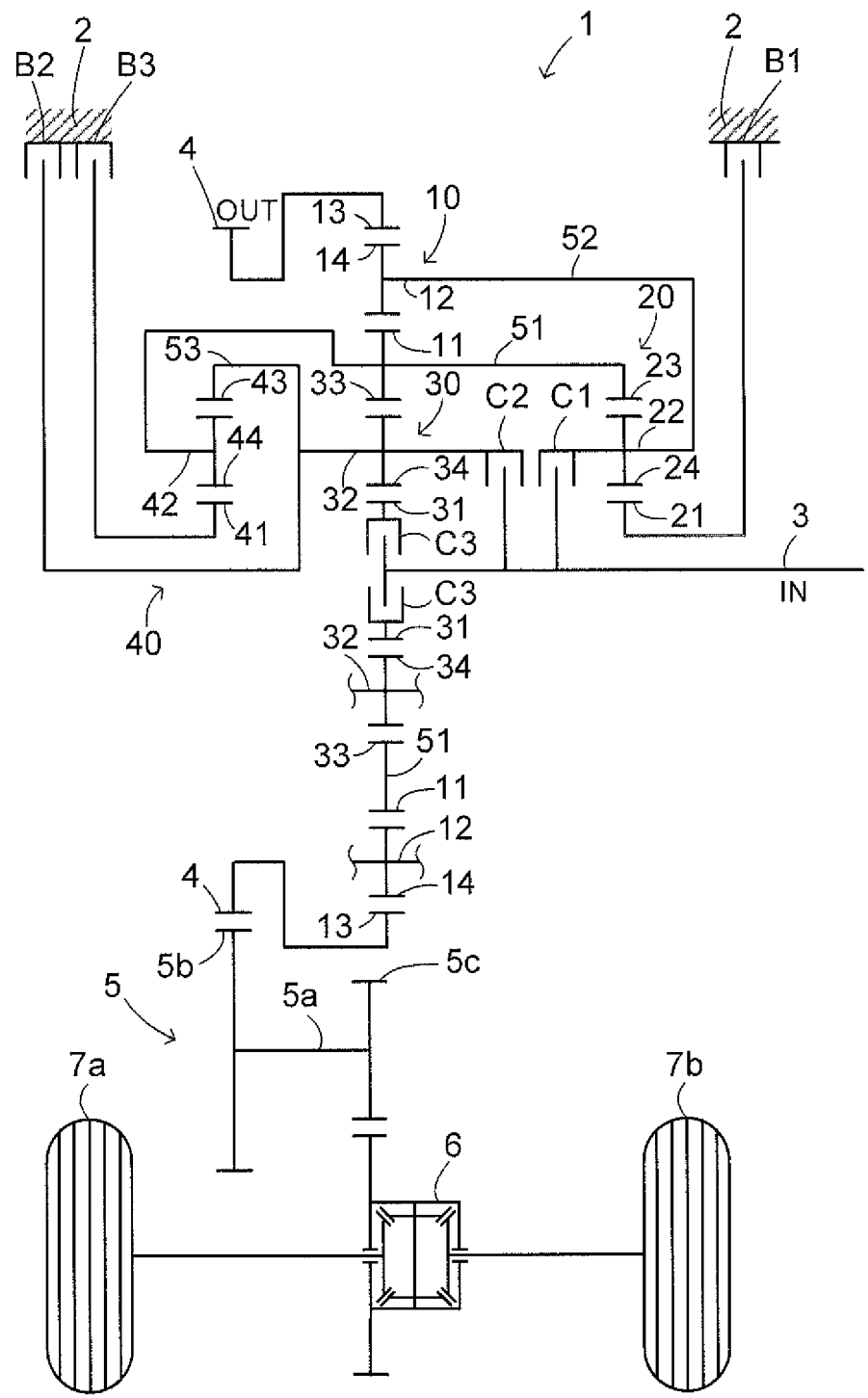
FIG. 1 is a diagram illustrating a schematic configuration of an automatic transmission device 1 according to an embodiment.

FIG. 1 is a diagram illustrating a schematic configuration of an automatic transmission device 1 according to an embodiment of the present invention. The automatic transmission device 1 according to the embodiment is constituted as a stepped speed change mechanism that includes four single-pinion planetary gear mechanisms 10, 20, 30, and 40, three clutches C1 to C3, and three brakes B1 to B3, that is mounted on a vehicle of a type (for example, a front-engine front-drive type) in which an engine as an internal combustion engine (not illustrated) is disposed transversely (in the left-right direction of the vehicle), and that receives power from the engine through an input shaft 3 via a starting device such as a torque converter (not illustrated) and changes the speed of the input power to output the power to an output gear 4. The power output to the output gear 4 is output to left and right drive wheels 7a and 7b via a gear mechanism 5 and a differential gear 6. The gear mechanism 5 is constituted from a counter shaft 5a having a rotational axis disposed in parallel with the rotational axis of the output gear 4, a counter driven gear 5b attached to the counter shaft 5a and meshed with the output gear 4, and a differential drive gear 5c also attached to the counter shaft 5a and meshed with a ring gear of the differential gear 6. In the lower part of FIG. 1 with respect to the input shaft 3, the connection between the output gear 4 and the gear mechanism 5, among components of the automatic transmission device 1, is mainly illustrated, and some of the other components are not illustrated.

In the automatic transmission device 1 according to the embodiment, as illustrated in FIG. 1, the second planetary gear mechanism 20, the first planetary gear mechanism 10 and the third planetary gear mechanism 30, and the fourth planetary gear mechanism 40 are disposed in this order from the input shaft 3 side. The first planetary gear mechanism 10 is disposed on the outer peripheral side of the third planetary gear mechanism 30.

The first planetary gear mechanism 10 includes a sun gear 11 which is an externally toothed gear, a ring gear 13 which is an internally toothed gear disposed concentrically with the sun gear 11, a plurality of pinion gears 14 meshed with the sun gear 11 and meshed with the ring gear 13, and a carrier 12 that rotatably and revolvably holds the plurality of pinion gears 14 by coupling the pinion gears 14 to each other. The first planetary gear mechanism 10 is constituted as a single-pinion planetary gear mechanism. Thus, the three rotary elements, namely the sun gear 11, the ring gear 13, and the carrier 12, form a sequence of the sun gear 11, the carrier 12, and the ring gear 13 when arranged in the order at intervals corresponding to the gear ratios in the velocity diagram. The gear ratio $\lambda 1$ of the first planetary gear, mechanism 10 (the number of teeth of the sun gear 11/the number of teeth of the ring gear 13) is set to 0.60, for example.

The second planetary gear mechanism 20 includes a sun gear 21 which is an externally toothed gear, a ring gear 23 which is an internally toothed gear disposed concentrically with the sun gear 21, a plurality of pinion gears 24 meshed with the sun gear 21 and meshed with the ring gear 23, and a carrier 22 that rotatably and revolvably holds the plurality of pinion gears 24 by coupling the pinion gears 24 to each other. The second planetary gear mechanism 20 is constituted as a single-pinion planetary gear mechanism. Thus, the three rotary elements, namely the sun gear 21, the ring gear 23, and the carrier 22, form a sequence of the sun gear 21, the carrier 22, and the ring gear 23 when arranged in the order at intervals corresponding to the gear ratios in the velocity diagram. The gear ratio $\lambda 2$ of the second planetary gear mechanism 20 (the number of teeth of the sun gear 21/the number of teeth of the ring gear 23) is set to 0.30, for example.

The third planetary gear mechanism 30 includes a sun gear 31 which is an externally toothed gear, a ring gear 33 which is an internally toothed gear disposed concentrically with the sun gear 31, a plurality of pinion gears 34 meshed with the sun gear 31 and meshed with the ring gear 33, and a carrier 32 that rotatably and revolvably holds the plurality of pinion gears 34 by coupling the pinion gears 34 to each other. The third planetary gear mechanism 30 is constituted as a single-pinion planetary gear mechanism. Thus, the three rotary elements, namely the sun gear 31, the ring gear 33, and the carrier 32, form a sequence of the sun gear 31, the carrier 32, and the ring gear 33 when arranged in the order at intervals corresponding to the gear ratios in the velocity diagram. The gear ratio $\lambda 3$ of the third planetary gear mechanism 30 (the number of teeth of the sun gear 31/the number of teeth of the ring gear 33) is set to 0.45, for example.

The fourth planetary gear mechanism 40 includes a sun gear 41 which is an externally toothed gear, a ring gear 43 which is an internally toothed gear disposed concentrically with the sun gear 41, a plurality of pinion gears 44 meshed with the sun gear 41 and meshed with the ring gear 43, and a carrier 42 that rotatably and revolvably holds the plurality of pinion gears 44 by coupling the pinion gears 44 to each other. The fourth planetary gear mechanism 40 is constituted as a single-pinion planetary gear mechanism. Thus, the three rotary elements, namely the sun gear 41, the ring gear 43, and the carrier 42, form a sequence of the sun gear 41, the carrier 42, and the ring gear 43 when arranged in the order at intervals corresponding to the gear ratios in the velocity diagram. The gear ratio $\lambda 4$ of the fourth planetary gear mechanism 40 (the number of teeth of the sun gear 41/the number of teeth of the ring gear 43) is set to 0.65, for example.

The sun gear 11 of the first planetary gear mechanism 10 is coupled to the ring gear 23 of the second planetary gear mechanism 20, the ring gear 33 of the third planetary gear mechanism 30, and the carrier 42 of the fourth planetary gear mechanism 40 by a first coupling element 51. The carrier 12 of the first planetary gear mechanism 10 is coupled to the carrier 22 of the second planetary gear mechanism 20 by a second coupling element 52. In addition, the carrier 32 of the third planetary gear mechanism 30 is coupled to the ring gear 43 of the fourth planetary gear mechanism 40 by a third coupling element 53. In the automatic transmission device 1 according to the embodiment, as discussed above, the first planetary gear mechanism 10 is disposed on the outer peripheral side of the third planetary gear mechanism 30. That is, an externally toothed gear is formed on the outer peripheral side of the ring gear 33 of the third planetary gear mechanism 30 to be used as the sun gear 11 of the first planetary gear mechanism 10, and the ring gear 33, the first coupling element 51, and the sun gear 11 are formed integrally with each other. Thus, the first coupling element 51 serves an element that couples the ring gear 33 and the sun gear 11 of the first planetary gear mechanism 10 in the radial direction on the outer peripheral side of the ring gear 33 which is positioned on the outermost periphery of the third planetary gear mechanism 30, and also serves as an element that couples the ring gear 23 of the second planetary gear mechanism 20 and the carrier 42 of the fourth planetary gear mechanism 40.

The second coupling element 52 (the carrier 12, the carrier 22) of the automatic transmission device 1 according to the embodiment is connected to the input shaft 3 via the clutch C1. The third coupling element 53 (the carrier 32, the ring gear 43) is connected to the input shaft 3 via the clutch C2. In addition, the sun gear 31 of the third planetary gear mechanism 30 is connected to the input shaft 3 via the clutch C3. The sun gear 21 of the second planetary gear mechanism. 20 is connected to a case (automatic transmission device case) 2 via the brake B1. The third coupling element 53 (the carrier 32, the ring gear 43) is connected to the case 2 via the brake B2. In addition, the sun gear 41 of the fourth planetary gear mechanism 40 is connected to the case 2 via the brake B3. The output gear 4 is connected to the ring gear 13 of the first planetary gear mechanism 10. Here, in the embodiment, the three clutches C-1 to C-3 and the three brakes B-1 to B-3 are constituted as hydraulically driven friction clutches and friction brakes that are engaged by pressing friction plates using a piston.

Figure 3:
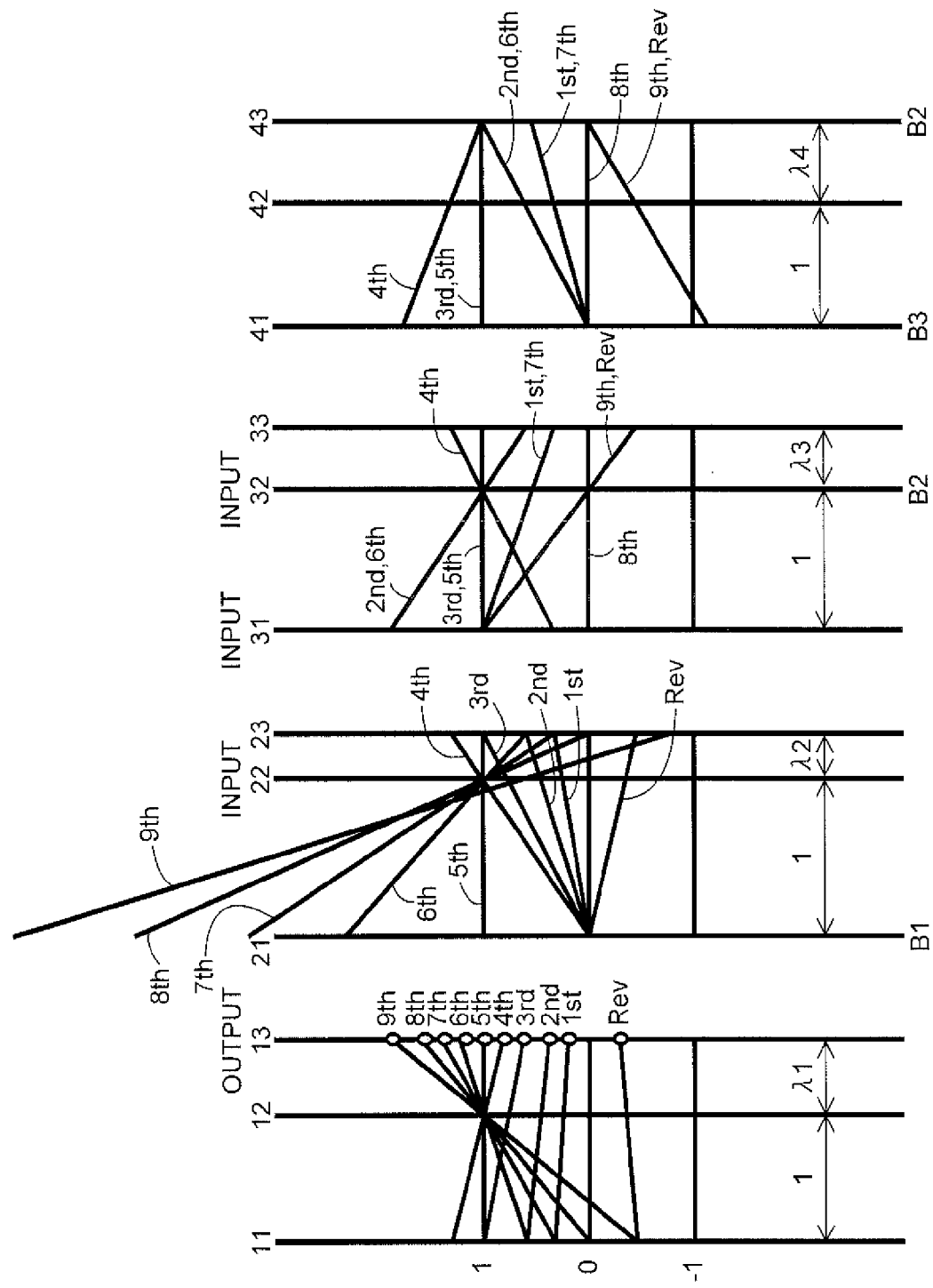
FIG. 3 is a velocity diagram of the automatic transmission device 1.

The thus configured automatic transmission device 1 according to the embodiment can switchably establish a first forward speed to a ninth forward speed and a reverse speed by engaging and disengaging the three clutches C1 to C3 and engaging and disengaging the three brakes B1 to B3 in combination. FIG. 2 is an operation table of the automatic transmission device 1. FIG. 3 includes velocity diagrams of the first to fourth planetary gear mechanisms 10, 20, 30, and 40 of the automatic transmission device 1. In FIG. 3, the velocity diagram of the first planetary gear mechanism 10, the velocity diagram of the second planetary gear mechanism 20, the velocity diagram of the third planetary gear mechanism 30, and the velocity diagram of the fourth planetary gear mechanism 40 are arranged in this order from the left. In each of the velocity diagrams, the sun gear, the carrier, and the ring gear are arranged in this order from the left. In FIG. 3, in addition, "1st" indicates the first forward speed, "2nd" indicates the second forward speed, "3rd" indicates the third forward speed, "4th" to "9th" indicate the fourth forward speed to the ninth forward speed, and "Rev" indicates the reverse speed. "$\lambda 1$" to "$\lambda 4$" indicate the respective gear ratios of the planetary gear mechanisms. "B1", "B2", and "B3" indicate the brakes B1 to B3. "INPUT" indicates the position of connection of the input shaft 3. "OUTPUT" indicates the position of connection of the output gear 4.

In the automatic transmission device 1 according to the embodiment, as illustrated in FIG. 2, the first forward speed to the ninth forward speed and the reverse speed are established as follows. For the gear ratio (the rotational speed of the input shaft 3/the rotational speed of the output gear 4), the gear ratios $\lambda 2$, $\lambda 3$, and $\lambda 4$ of the first to fourth planetary gear mechanisms 10, 20, 30, and 40 are set to 0.60, 0.30, 0.45, and 0.65, respectively.

(1) The first forward speed can be established by engaging the clutch C3, the brake B1, and the brake B3 and disengaging the clutch C1, the clutch C2, and the brake B2, and has a gear ratio of 4.906.

(2) The second forward speed can be established by engaging the clutch C2, the brake B1, and the brake B3 and disengaging the clutch C1, the clutch C3, and the brake B2, and has a gear ratio of 2.616.

(3) The third forward speed can be established by engaging the clutch C2, the clutch C3, and the brake B1 and disengaging the clutch C1, the brake B2, and the brake B3, and has a gear ratio of 1.585.

(4) The fourth forward speed can be established by engaging the clutch C1, the clutch C2, and the brake B1 and disengaging the clutch C3, the brake B2, and the brake B3, and has a gear ratio of 1.220.

(5) The fifth forward speed can be established by engaging the clutch C1, the clutch C2, and the clutch C3 and disengaging the brake B1, the brake B2, and the brake B3, and has a gear ratio of 1.000.

(6) The sixth forward speed can be established by engaging the clutch C1, the clutch C2, and the brake B3 and disengaging the clutch C3, the brake B1, and the brake B2, and has a gear ratio of 0.809.

(7) The seventh forward speed can be established by engaging the clutch C1, the clutch C3, and the brake B3 and disengaging the clutch C2, the brake B1, and the brake B2, and has a gear ratio of 0.711.

(8) The eighth forward speed can be established by engaging the clutch C1, the brake B2, and the brake B3 and disengaging the clutch C2, the clutch C3, and the brake B1, and has a gear ratio of 0.625. With the eighth forward speed established, in the second planetary gear mechanism 20, the sun gear 21 is disengaged through disengagement of the brake B1, and thus the second planetary gear mechanism 20 is not involved in torque transfer between the input shaft 3 and the output gear 4. In the third planetary gear mechanism 30, the sun gear 31 is disengaged through disengagement of the clutch C3, and thus the third planetary gear mechanism 30 is not involved in torque transfer between the input shaft 3 and the output gear 4. In the fourth planetary gear mechanism 40, the ring gear 43 and the sun gear 41 are held unrotatably stationary through engagement of the brake B2 and the brake B3. Thus, the carrier 42 is also made unrotatable, and the fourth planetary gear mechanism 40 does not operate as a gear mechanism for torque transfer between the input shaft 3 and the output gear 4. Thus, with the eighth forward speed established, only one of the planetary gear mechanisms, namely the first planetary gear mechanism 10, operates as a gear mechanism for torque transfer between the input shaft 3 and the output gear 4.

(9) The ninth forward speed can be established by engaging the clutch C1, the clutch C3, and the brake B2 and disengaging the clutch C2, the brake B1, and the brake B3, and has a gear ratio of 0.535. With the ninth forward speed established, in the second planetary gear mechanism 20, the sun gear 21 is disengaged through disengagement of the brake B1, and thus the second planetary gear mechanism 20 is not involved in torque transfer between the input shaft 3 and the output gear 4. In the fourth planetary gear mechanism 40, the sun gear 41 is disengaged through disengagement of the brake B3, and thus the fourth planetary gear mechanism 40 is not involved in torque transfer between the input shaft 3 and the output gear 4. Thus, with the ninth forward speed established, two of the planetary gear mechanisms, namely the first planetary gear mechanism 10 and the third planetary gear mechanism 30, operate as a gear mechanism for torque transfer between the input shaft 3 and the output gear 4.

(10) The reverse speed can be established by engaging the clutch C3, the brake B1, and the brake B2 and disengaging the clutch C1, the clutch C2, and the brake B3, and has a gear ratio of −3.523.

In the automatic transmission device 1 according to the embodiment, with the ninth forward speed which is the highest speed established, two of the planetary gear mechanisms, namely the first planetary gear mechanism 10 and the third planetary gear mechanism 30, operate as a gear mechanism for torque transfer between the input shaft 3 and the output gear 4. In the automatic transmission device 901 according to the conventional example illustrated in FIG. 5, on the other hand, with the ninth forward speed which is the highest speed established, all (four) of the first to fourth planetary gear mechanisms 910, 920, 930, and 940 operate for torque transfer between the input shaft 903 and the output gear 904. Thus, in the automatic transmission device 1 according to the embodiment, the number of planetary gear mechanisms that operate for torque transfer with the highest speed established is reduced compared to the automatic transmission device 901 according to the conventional example. As a result, with the automatic transmission device 1 according to the embodiment, it is possible to reduce a loss due to meshing between gears and enhance the torque transfer efficiency compared to the automatic transmission device 901 according to the conventional example. In the automatic transmission device 1 according to the embodiment, with the eighth forward speed which is one step lower than the highest speed established, meanwhile, only one of the planetary gear mechanisms, namely the first planetary gear mechanism 10, operates as a gear mechanism for torque transfer between the input shaft 3 and the output gear 4. In the automatic transmission device 901 according to the conventional example illustrated in FIG. 5, on the other hand, with the eighth forward speed which is one step lower than the highest speed established, two of the planetary gear mechanisms, namely the first planetary gear mechanism 910 and the second planetary gear mechanism 920, operate for torque transfer between the input shaft 903 and the output gear 904. Thus, in the automatic transmission device 1 according to the embodiment, the number of planetary gear mechanisms that operate for torque transfer with the highest speed established is reduced compared to the automatic transmission device 901 according to the conventional example. As a result, with the automatic transmission device 1 according to the embodiment, it is possible to reduce a loss due to meshing between gears and enhance the torque transfer efficiency compared to the automatic transmission device 901 according to the conventional example. Thus, because the highest speed and a shift speed that is one step lower than the highest speed are used for travel at a relatively high speed, for example cruising on a highway, in the case where the automatic transmission device 1 is mounted on a vehicle, it is possible to enhance the torque transfer efficiency during travel at a relatively high speed, and to improve the fuel efficiency of the vehicle.

Figures 5, 6:
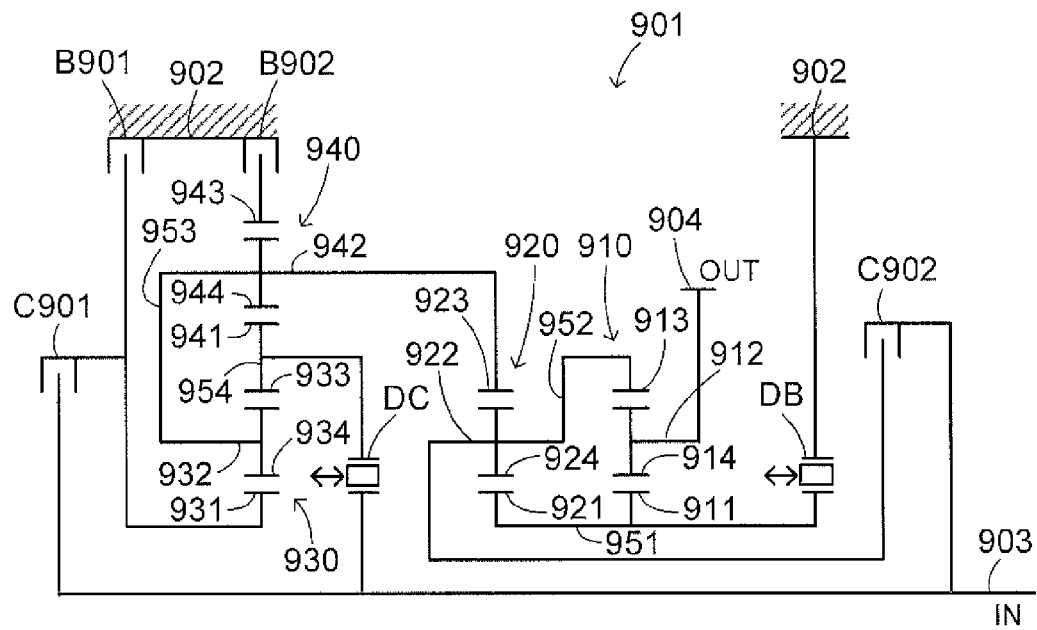
FIG. 5 is a diagram illustrating a schematic configuration of an automatic transmission device 901 according to a conventional example.
FIG. 6 is an operation table of the automatic transmission device 901 according to the conventional example.

The rotational speeds of the pinion gears constituting the planetary gear mechanisms of the automatic transmission device 1 according to the embodiment in which the gear ratios $\lambda 1, \lambda 2, \lambda 3$, and $\lambda 4$ of the first to fourth planetary gear mechanisms 10, 20, 30, and 40 are set to 0.60, 0.30, 0.45, and 0.65, respectively, and of the automatic transmission device 901 according to the conventional example illustrated in FIG. 5 will be discussed below. For the automatic transmission device 1 according to the embodiment, the highest one of the rotational speeds of the pinion gears 14, 24, 34, and 44 of the first to fourth planetary gear mechanisms 10, 20, 30, and 40 is about 4.4 times the rotational speed of the input shaft 3. For the automatic transmission device 901 according to the conventional example, however, the highest one of the rotational speeds of the pinion gears is about 4.8 times the rotational speed of the input shaft 903. Thus, with the automatic transmission device 1 according to the embodiment, it is possible to reduce the highest one of the rotational speeds of the pinion gears 14, 24, 34, and 44 compared to the automatic transmission device 901 according to the conventional example. With the first forward speed, with which the rotational speed of the input shaft 3 is high, established, in particular, the highest one of the rotational speeds of the pinion gears 14, 24, 34, and 44 of the first to fourth planetary gear mechanisms 10, 20, 30, and 40 in the automatic transmission device 1 according to the embodiment is about 1.2 times the rotational speed of the input shaft 3. For the automatic transmission device 901 according to the conventional example, however, the highest one of the rotational speeds of the pinion gears is about 2.7 times the rotational speed of the input shaft 903. As a result, the automatic transmission device 1 according to the embodiment can improve the durability of parts such as bearings and pinion side washers and suppress a cost required for heat treatment or surface treatment for ensuring durability compared to the automatic transmission device 901 according to the conventional example.

With the automatic transmission device 1 according to the embodiment described above, there can be provided an automatic transmission device including the single-pinion first to fourth planetary gear mechanisms 10, 20, 30, and 40, the three clutches C1 to C3, and the three brakes B1 to B3 and capable of selectively establishing the first forward speed to the ninth forward speed and the reverse speed, in which: the sun gear 11 of the first planetary gear mechanism 10 is coupled to the ring gear 23 of the second planetary gear mechanism 20, the ring gear 33 of the third planetary gear mechanism 30, and the carrier 42 of the fourth planetary gear mechanism 40 by the first coupling element 51; the carrier 12 of the first planetary gear mechanism 10 is coupled to the carrier 22 of the second planetary gear mechanism 20 by the second coupling element 52; the carrier 32 of the third planetary gear mechanism 30 is coupled to the ring gear 43 of the fourth planetary gear mechanism 40 by the third coupling element 53; the second coupling element 52 (the carrier 12, the carrier 22) is connected to the input shaft 3 via the clutch C1; the third coupling element 53 (the carrier 32, the ring gear 43) is connected to the input shaft 3 via the clutch C2; the sun gear 31 of the third planetary gear mechanism 30 is connected to the input shaft 3 via the clutch C3; the sun gear 21 of the second planetary gear mechanism 20 is connected to the case 2 via the brake B1; the third coupling element 53 (the carrier 32, the ring gear 43) is connected to the case 2 via the brake B2; the sun gear 41 of the fourth planetary gear mechanism 40 is connected to the case 2 via the brake B3; and the ring gear 13 of the first planetary gear mechanism 10 is connected to the output gear 4.

In the automatic transmission device 1 according to the embodiment, the ninth forward speed which is the highest speed is established by engaging the clutch C1, the clutch C3, and the brake B2 and disengaging the clutch C2, the brake B1, and the brake B3. Thus, two of the planetary gear mechanisms, namely the first planetary gear mechanism 10 and the third planetary gear mechanism 30, operate as a gear for torque transfer between the input shaft 3 and the output gear 4, and the number of planetary gear mechanisms that operate for torque transfer with the highest speed established can be reduced compared to the automatic transmission device 901 according to the conventional example, in which with the ninth forward speed which is the highest speed established, all (four) of the first to fourth planetary gear mechanisms 910, 920, 930, and 940 operate for torque transfer between the input shaft 903 and the output gear 904. This makes it possible to reduce a loss due to meshing between gears, and to enhance the torque transfer efficiency. In the automatic transmission device 1 according to the embodiment, in addition, the eighth forward speed which is one step lower than the highest speed is established by engaging the clutch C1, the brake B2, and the brake B3 and disengaging the clutch C2, the clutch C3, and the brake B1. Thus, only one of the planetary gear mechanisms, namely the first planetary gear mechanism 10, operates as a gear for torque transfer between the input shaft 3 and the output gear 4, and the number of planetary gear mechanisms that operate for torque transfer with a shift speed that is one step lower than the highest speed established can be reduced compared to the automatic transmission device 901 according to the conventional example, in which with the eighth forward speed which is one step lower than the highest speed established, two of the planetary gear mechanisms, namely the first planetary gear mechanism 910 and the second planetary gear mechanism 920, operate for torque transfer between the input shaft 903 and the output gear 904. This makes it possible to reduce a loss due to meshing between gears, and to enhance the torque transfer efficiency. As a result, the torque transfer efficiency of the automatic transmission device can be improved.

In the automatic transmission device 1 according to the embodiment, the first planetary gear mechanism 10 is disposed on the outer peripheral side of the third planetary gear mechanism 30. Thus, although the automatic transmission device 1 is made larger in the radial direction, the automatic transmission device 1 can be made shorter in the axial direction than an automatic transmission device in which four planetary gear mechanisms are disposed side by side. That is, the automatic transmission device 1 has the same length in the axial direction as that of an automatic transmission device in which three planetary gear mechanisms are disposed side by side.

In the automatic transmission device 1 according to the embodiment, the highest one of the rotational speeds of the pinion gears 14, 24, 34, and 44 of the first to fourth planetary gear mechanisms 10, 20, 30, and 40 is low compared to the automatic transmission device 901 according to the conventional example. Thus, it is possible to improve the durability of the device and suppress a cost required for heat treatment or surface treatment for ensuring durability.

Figure 4:
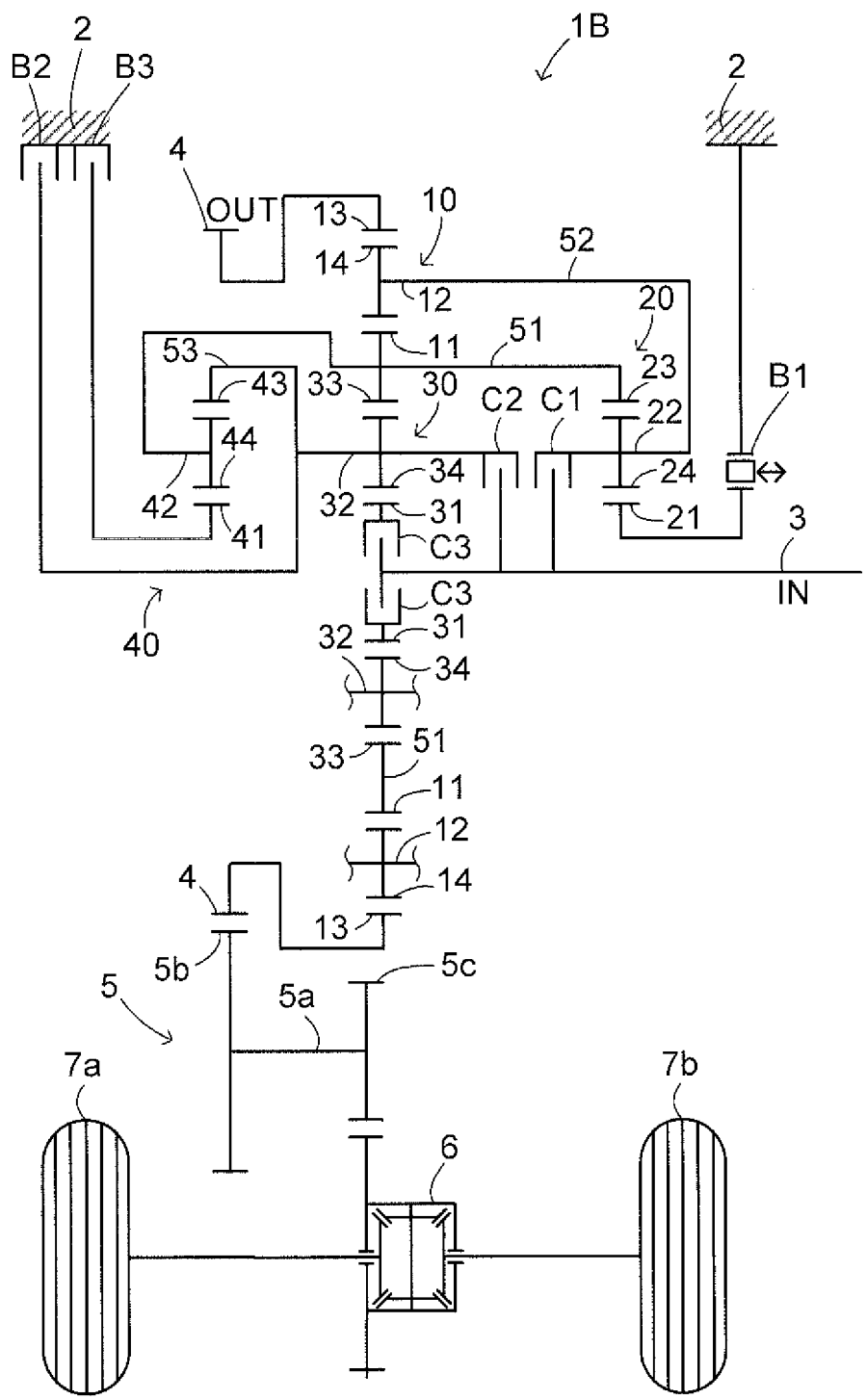
FIG. 4 is a diagram illustrating a schematic configuration of an automatic transmission device 1B according to a modification.

In the automatic transmission device 1 according to the embodiment, all of the three clutches C-1 to C-3 are constituted as friction clutches, and all of the three brakes B-1 to B-3 are constituted as friction brakes. However, some of the clutches and brakes may be constituted as dog clutches and dog brakes in place of the friction clutches and the friction brakes. An automatic transmission device 1B according to a modification of the automatic transmission device 1, in which the brake B1 is constituted as a dog brake, is illustrated in FIG. 4. The operation table and the velocity diagram of the automatic transmission device 1B according to the modification are the same as those in FIGS. 2 and 3. The dog brake tends to cause a shock during engagement, and requires synchronization control for synchronizing rotations. Because the brake B1 is kept engaged from the first forward speed to the fourth forward speed and kept disengaged from the fifth forward speed to the ninth forward speed, the brake B1 is not frequently repeatedly engaged and disengaged, and the synchronization control is less frequently performed. Therefore, degradation in shifting feeling is suppressed even if the dog brake is adopted.

In the automatic transmission device 1 according to the embodiment, the gear ratios $\lambda 1$, $\lambda 2$, $\lambda 3$, and $\lambda 4$ of the first to fourth planetary gear mechanisms 10, 20, 30, and 40 are set to 0.60, 0.30, 0.45, and 0.65, respectively. However, the gear ratios $\lambda 1$, $\lambda 2$, $\lambda 3$, and $\lambda 4$ are not limited to such values.

In the automatic transmission device 1 according to the embodiment, all of the first to fourth planetary gear mechanisms 10, 20, 30, and 40 are constituted as a single-pinion planetary gear mechanism. However, some or all of the first to fourth planetary gear mechanisms 10, 20, 30, and 40 may be constituted as a double-pinion planetary gear mechanism.

The automatic transmission device 1 according to the embodiment is an automatic transmission device capable of establishing the first forward speed to the ninth forward speed and the reverse speed by engaging three of the three clutches C1 to C3 and the three brakes B1 to B3 and disengaging the other three. However, the automatic transmission device 1 may be an automatic transmission device capable of establishing eight speeds excluding one speed from the nine speeds from the first forward speed to the ninth forward speed, or seven speeds or less excluding a plurality of speeds from the nine speeds, and the reverse speed.

Here, the correspondence between the main elements of the embodiment and the main elements of the invention described in the "SUMMARY OF THE INVENTION" section will be described. In the embodiment, the input shaft 3 corresponds to the "input member". The output gear 4 corresponds to the "output member". The first planetary gear mechanism 10 corresponds to the "first planetary gear mechanism". The sun gear 11 corresponds to the "first rotary element". The carrier 12 corresponds to the "second rotary element". The ring gear 13 corresponds to the "third rotary element". The second planetary gear mechanism 20 corresponds to the "second planetary gear mechanism". The sun gear 21 corresponds to the "fourth rotary element". The carrier 22 corresponds to the "fifth rotary element". The ring gear 23 corresponds to the "sixth rotary element". The third planetary gear mechanism 30 corresponds to the "third planetary gear mechanism". The sun gear 31 corresponds to the "seventh rotary element". The carrier 32 corresponds to the "eighth rotary element". The ring gear 33 corresponds to the "ninth rotary element". The fourth planetary gear mechanism 40 corresponds to the "fourth planetary gear mechanism". The sun gear 41 corresponds to the "tenth rotary element". The carrier 42 corresponds to the "eleventh rotary element". The ring gear 43 corresponds to the "twelfth rotary element". The first coupling element 51 corresponds to the "first coupling element". The second coupling element 52 corresponds to the "second coupling element". The third coupling element 53 corresponds to the "third coupling element". The clutch C1 corresponds to the "first clutch". The clutch C2 corresponds to the "second clutch". The clutch C3 corresponds to the "third clutch". The brake B1 corresponds to the "first brake". The brake B2 corresponds to the "second brake". The brake B3 corresponds to the "third brake". The correspondence between the main elements of the embodiment and the main elements of the invention described in the "SUMMARY OF THE INVENTION" section does not limit the elements of the invention described in the "SUMMARY OF THE INVENTION" section, because the embodiment is an example given for the purpose of specifically describing the best mode for carrying out the invention described in the "SUMMARY OF THE INVENTION" section. That is, the invention described in the "SUMMARY OF THE INVENTION" section should be construed on the basis of the description in that section, and the embodiment is merely a specific example of the invention described in the "SUMMARY OF THE INVENTION" section.

While the best mode for carrying out the present invention has been described above by way of an embodiment, it is a matter of course that the present invention is not limited to the embodiment in any way, and that the present invention may be implemented in various forms without departing from the scope and sprit of the present invention.

INDUSTRIAL APPLICABILITY

The present invention is applicable to the automatic transmission device manufacturing industry and so forth.

The invention claimed is:

1. An automatic transmission device that changes a speed of power input to an input member to output the power to an output member, characterized by comprising:
  a first planetary gear mechanism including first to third rotary elements that form a sequence of the first rotary element, the second rotary element, and the third rotary element;
  a second planetary gear mechanism including fourth to sixth rotary elements that form a sequence of the fourth rotary element, the fifth rotary element, and the sixth rotary element;
  a third planetary gear mechanism including seventh to ninth rotary elements that form a sequence of the seventh rotary element, the eighth rotary element, and the ninth rotary element;
  a fourth planetary gear mechanism including tenth to twelfth rotary elements that form a sequence of the tenth rotary element, the eleventh rotary element, and the twelfth rotary element;
  a first coupling element that couples the first rotary element, the sixth rotary element, the ninth rotary element, and the eleventh rotary element to each other;
  a second coupling element that couples the second rotary element and the fifth rotary element to each other;
  a third coupling element that couples the eighth rotary element and the twelfth rotary element to each other;
  a first clutch that is configured to engage the second coupling element and the input member with each other;
  a second clutch that is configured to engage the third coupling element and the input member with each other;
  a third clutch that is configured to engage the seventh rotary element and the input member with each other;
  a first brake that is configured to engage so as to hold the fourth rotary element stationary with respect to an automatic transmission device case;
  a second brake that is configured to engage so as to hold the third coupling element stationary with respect to the automatic transmission device case; and
  a third brake that is configured to engage so as to hold the tenth rotary element stationary with respect to the automatic transmission device case, wherein
  the output member is connected to the third rotary element.

2. The automatic transmission device according to claim 1, wherein:
  a first forward speed is established by engaging the third clutch, the first brake, and the third brake and disengaging the first clutch, the second clutch, and the second brake;

a second forward speed is established by engaging the second clutch, the first brake, and the third brake and disengaging the first clutch, the third clutch, and the second brake;

a third forward speed is established by engaging the second clutch, the third clutch, and the first brake and disengaging the first clutch, the second brake, and the third brake;

a fourth forward speed is established by engaging the first clutch, the second clutch, and the first brake and disengaging the third clutch, the second brake, and the third brake;

a fifth forward speed is established by engaging the first clutch, the second clutch, and the third clutch and disengaging the first brake, the second brake, and the third brake;

a sixth forward speed is established by engaging the first clutch, the second clutch, and the third brake and disengaging the third clutch, the first brake, and the second brake;

a seventh forward speed is established by engaging the first clutch, the third clutch, and the third brake and disengaging the second clutch, the first brake, and the second brake;

an eighth forward speed is established by engaging the first clutch, the second brake, and the third brake and disengaging the second clutch, the third clutch, and the first brake;

a ninth forward speed is established by engaging the first clutch, the third clutch, and the second brake and disengaging the second clutch, the first brake, and the third brake; and a reverse speed is established by engaging the third clutch, the first brake, and the second brake and disengaging the first clutch, the second clutch, and the third brake.

3. The automatic transmission device according to claim 2, wherein:

the first planetary gear mechanism, the second planetary gear mechanism, the third planetary gear mechanism, and the fourth planetary gear mechanism are each constituted as a single-pinion planetary gear mechanism in which a sun gear, a ring gear, and a carrier are used as the three rotary elements;

the first rotary element, the fourth rotary element, the seventh rotary element, and the tenth rotary element are each a sun gear;

the second rotary element, the fifth rotary element, the eighth rotary element, and the eleventh rotary element are each a carrier; and the third rotary element, the sixth rotary element, the ninth rotary element, and the twelfth rotary element are each a ring gear.

4. The automatic transmission device according to claim 3, wherein the ninth rotary element and the first rotary element are formed integrally.

5. The automatic transmission device according to claim 4, wherein the planetary gear mechanisms are disposed in an order of the second planetary gear mechanism, the first planetary gear mechanism and the third planetary gear mechanism, and the fourth planetary gear mechanism from an input shaft side.

6. The automatic transmission device according to claim 3, wherein the planetary gear mechanisms are disposed in an order of the second planetary gear mechanism, the first planetary gear mechanism and the third planetary gear mechanism, and the fourth planetary gear mechanism from an input shaft side.

7. The automatic transmission device according to claim 2, wherein the ninth rotary element and the first rotary element are formed integrally.

8. The automatic transmission device according to claim 7, wherein the planetary gear mechanisms are disposed in an order of the second planetary gear mechanism, the first planetary gear mechanism and the third planetary gear mechanism, and the fourth planetary gear mechanism from an input shaft side.

9. The automatic transmission device according to claim 2, wherein the planetary gear mechanisms are disposed in an order of the second planetary gear mechanism, the first planetary gear mechanism and the third planetary gear mechanism, and the fourth planetary gear mechanism from an input shaft side.

10. The automatic transmission device according to claim 2, wherein the first brake is constituted as a dog brake.

11. The automatic transmission device according to claim 1, wherein:

the first planetary gear mechanism, the second planetary gear mechanism, the third planetary gear mechanism, and the fourth planetary gear mechanism are each constituted as a single-pinion planetary gear mechanism in which a sun gear, a ring gear, and a carrier are used as the three rotary elements;

the first rotary element, the fourth rotary element, the seventh rotary element, and the tenth rotary element are each a sun gear;

the second rotary element, the fifth rotary element, the eighth rotary element, and the eleventh rotary element are each a carrier; and the third rotary element, the sixth rotary element, the ninth rotary element, and the twelfth rotary element are each a ring gear.

12. The automatic transmission device according to claim 11, wherein the ninth rotary element and the first rotary element are formed integrally.

13. The automatic transmission device according to claim 12, wherein the planetary gear mechanisms are disposed in an order of the second planetary gear mechanism, the first planetary gear mechanism and the third planetary gear mechanism, and the fourth planetary gear mechanism from an input shaft side.

14. The automatic transmission device according to claim 11, wherein the planetary gear mechanisms are disposed in an order of the second planetary gear mechanism, the first planetary gear mechanism and the third planetary gear mechanism, and the fourth planetary gear mechanism from an input shaft side.

15. The automatic transmission device according to claim 1, wherein the first brake is constituted as a dog brake.

16. The automatic transmission device according to claim 1, wherein the ninth rotary element and the first rotary element are formed integrally.

17. The automatic transmission device according to claim 16, wherein
the planetary gear mechanisms are disposed in an order of the second planetary gear mechanism, the first planetary gear mechanism and the third planetary gear mechanism, and the fourth planetary gear mechanism from an input shaft side.

18. The automatic transmission device according to claim 16, wherein
the first brake is constituted as a dog brake.

19. The automatic transmission device according to claim 1, wherein
the planetary gear mechanisms are disposed in an order of the second planetary gear mechanism, the first planetary gear mechanism and the third planetary gear mechanism, and the fourth planetary gear mechanism from an input shaft side.

20. The automatic transmission device according to claim 1, wherein
the first brake is constituted as a dog brake.

* * * * *